United States Patent [19]
Witteveen

[11] Patent Number: 5,430,571
[45] Date of Patent: Jul. 4, 1995

[54] ROTARY MIRROR SYSTEM

[75] Inventor: Bontko Witteveen, EC Venlo, Netherlands

[73] Assignee: Oce-Nederland, B.V., Venlo, Netherlands

[21] Appl. No.: 156,721

[22] Filed: Nov. 24, 1993

[30] Foreign Application Priority Data

Nov. 26, 1992 [EP] European Pat. Off. .......... 92203647

[51] Int. Cl.$^6$ .............................................. G02B 26/08
[52] U.S. Cl. ................................... 359/216; 359/200; 359/211; 359/834; 250/236
[58] Field of Search ............... 359/198, 200, 211, 212, 359/216, 218, 219, 222, 223, 226, 833, 834, 850, 855, 871, 872; 310/90, 90.5; 384/109, 114, 115, 123; 250/234–236

[56] References Cited

U.S. PATENT DOCUMENTS

| | | | |
|---|---|---|---|
| 4,475,787 | 10/1984 | Starkweather | 359/216 |
| 4,662,709 | 5/1987 | Brueggemann | 359/216 |
| 4,772,136 | 9/1988 | Carter | 384/112 |
| 5,171,984 | 12/1992 | van Rosmalen | 250/236 |

FOREIGN PATENT DOCUMENTS

| | | |
|---|---|---|
| 0444958 | 9/1991 | European Pat. Off. . |
| 2927199 | 1/1981 | Germany . |
| 4001242 | 7/1991 | Germany . |
| 4226415 | 2/1990 | Japan . |
| 1285917 | 5/1990 | Japan . |

*Primary Examiner*—Ricky D. Shafer
*Assistant Examiner*—James Phan
*Attorney, Agent, or Firm*—Birch, Stewart, Kolasch & Birch

[57] ABSTRACT

A rotary mirror system for angularly deflecting a light beam including an air bearing arrangement rotatably supporting a mirror body on which one or more mirror facets are provided, the mirror body being the rotor of an electric motor, wherein the mirror facets are the side surfaces of an internal pyramid or frusto-pyramid formed in and opening towards one axial end surface of the mirror body and having an axis of symmetry coinciding with the rotational axis (A) of the mirror body, the orientation of the mirror facets, relative to the incoming light beam, being such that the reflected beam leaves the internal pyramid at an inclined angle with respect to the rotational axis (A).

8 Claims, 1 Drawing Sheet

ROTARY MIRROR SYSTEM

BACKGROUND OF THE INVENTION

1. Field of the Invention

The present invention relates to a light deflecting system and, more specifically, to a rotary mirror system for angularly deflecting a light beam, for example, in laser printers for deflecting the laser beam in the main scanning direction.

2. Discussion of Related Art

A rotary mirror system of the type for deflecting light beams is described in JP-A-1-285917. In this known system, the mirror body is shaped as a polygonal disc with mirror surfaces provided at the outer circumferential edge surfaces of the disc. The disc is provided with magnets which co-operate with magnets of a stator, thereby constituting an electric motor for driving the disc. The disc is rotatably supported on the stator by means of an air bearing which is formed by two hemispherical members provided at the center of the disc on the opposing main surfaces thereof and received in mating hemispherical cavities formed in bearing members of the stator. The hemispherical bearing surfaces are provided with spiral grooves for introducing air into the narrow gap between the mating bearing surfaces, so that an air cushion for providing a low-friction bearing is established. In this known device, the magnets are provided within the disc outwardly of the hemispherical bearing members, and the mirror facets are again disposed outwardly of the magnets, so that the disc as a whole must have comparatively large radial dimensions and accordingly a large moment of inertia. This makes it difficult to control gyro-effects, when the laser printer is moved or shocks are applied thereto while the mirror is rotating. Further, the large radial dimensions of the disc result in correspondingly large centrifugal forces which, in view of the limited mechanical strength of the disc, impose an upper limit to the achievable rotary speed. On the other hand, a rotary speed as high as possible would be desirable in order to provide a high printing efficiency.

Another problem encountered with the above-described prior art relates to the so-called wobble, i.e. an undesired deflection of the reflected beam in the direction normal to the scanning direction. This wobble is caused by slight misalignments of the mirror facets due to manufacturing tolerances, and by the minor play in the air bearing which may lead to slight vibrations or oscillations of the rotating mirror body. Due to the comparatively large mass and moments of inertia of the mirror body, the frequency of these oscillations may be in the range of the rotational frequency of the mirror body, so that slight imbalances of the mirror body may lead to resonance problems.

In DE-A-2927199 a wobble-free rotary mirror system has been proposed in which, however, the light beam is not angularly deflected but is subject to an oscillating parallel displacement. In this device, an internal roof prism is eccentrically provided in one axial end surface of the rotating mirror body, the mirror facets being formed by the angled internal surfaces of this roof prism. The incoming light beam is aligned with the axis of rotation, and is subject to double-reflection at both mirror facets, such that the outgoing beam is again parallel with the incoming beam but radially outwardly offset relative thereto. Due to the rotation of the mirror body, the outgoing beam rotates about the incoming beam. One component of the two-dimensional rotating movement of the reflected beam is cancelled by a cylinder lens, so that an oscillating one-dimensional movement is achieved at the focus of the cylinder lens. This system is substantially wobble-free because the outgoing beam after double-reflection is always parallel to the incoming beam, irrespective of slight angular displacements of the axis of the mirror body. However, with this device, the amplitude of the oscillating movement of the reflected beam is not larger than the diameter of the mirror body. Accordingly, this system is not suited for obtaining large scanning widths.

In U.S. Pat. No. 4,662,709, a mirror system is proposed in which mirror facets are formed by the side surfaces of an internal frusto-pyramid formed in one axial end surface of the rotating mirror body. The incoming light beam is reflected at one of the mirror facets into the interior of the frusto-pyramid and undergoes two reflections at fixed mirror surfaces provided stationarily within the internal pyramid, so that the light is reflected back to the mirror facet where it is reflected for a second time. In this system, the mirror body must also have large radial dimensions, because the stationary mirrors have to be accommodated in the interior of the internal pyramid formed in the mirror body.

In U.S. Pat. No. 4,475,787 there is disclosed a single facet wobble-free light scanner which utilizes a pentaprism as rotating mirror body. The incoming light beam is aligned with the axis of rotation of the prism and enters through one surface of the prism which is normal to the axis of rotation. The light beam is then reflected at two inner surfaces of the prism and leaves the prism through another surface at right angles to the incoming beam. A problem involved in this structure is that the pentaprism is not symmetric with respect to the axis of rotation, so that it is difficult to balance the rotating mirror body accurately enough for permitting a high speed of revolution.

SUMMARY OF THE INVENTION

Therefore, it is an object of the present invention to provide a rotary mirror system which will overcome the above-noted disadvantages.

It is a further object of the present invention to provide a rotary mirror system which has a simple and compact construction and can be operated at high speeds.

The foregoing objects and others are accomplished in accordance with the present invention, generally speaking, by providing a rotary mirror system comprising a means for providing an air bearing support for rotatably suspending or supporting a mirror body on which one or more mirror facets are provided, the mirror body being the rotor of an electric motor. The mirror facets correspond to side surfaces of an internal pyramid or frusto-pyramid formed in and opening towards one axial end surface of the mirror body and having an axis of symmetry coinciding with the rotational axis of the mirror body, the orientation of the mirror facets relative to the incoming light beam being such that the reflected beam leaves the internal pyramid at an inclined angle with respect to the rotational axis.

Since, according to the invention, the mirror facets are formed in an axial end face of the mirror body, the mirror body can be made small and light in weight, so that it has a low moment of inertia and can be operated at very high speeds of revolution without inducing excessive centrifugal forces. The internal pyramid contributes to the reduction in mass of the mirror body and, as it has an axis of symmetry coinciding with the rotational axis, the mirror body may easily be balanced so that it behaves like a symmetric top. In addition, the symmetric configuration of the internal pyramid is suitable for providing a multiple facet mirror. Since the mirror facets are formed by the inner surfaces of a pyramid-shaped cavity in the mirror body, it is not necessary to provide the mirror body with any projecting parts which would be subject to destructive mechanical stresses induced by the centrifugal forces at extremely high speeds. In the system according to the invention, the air bearing support may be provided on the complete circumferential surface of the mirror body, so that the whole mirror body is well supported against minor imbalances and a stable and hence wobble-free rotation of the mirror body can be achieved. Nevertheless, since the reflected light beam leaves the internal pyramid at an inclined angle with respect to the rotational axis, the rotation of the mirror body induces an angular displacement of the reflected beam about the rotational axis, so that the exposure spot at the downstream end of the reflected beam can be moved over a large scanning width.

Preferably, a pyramid-shaped transparent body is fitted into the internal pyramid of the mirror body, and the mirror facets are formed by a mirror finish, such as a metal plating or the like, on the side surfaces of the transparent pyramid-shaped body. If a sectional plane including the axis of rotation is considered, the optical properties of the transparent body are those of a prism. This is why the transparent body shall be termed "prism" hereinafter, although, geometrically, it is a pyramid rather than a prism. The surfaces of the prism forming the mirror facets can be machined with very high accuracy. Thus, a multiple-facet mirror with exactly adjusted mirror facets can be manufactured by forming a cavity with a roughly pyramidal shape in the end face of the mirror body and then inserting therein the precisely machined prism with the mirror finished side faces. The prism may be fixed within the cavity by means of an adhesive and is securely supported against centrifugal forces by the surrounding walls of the cavity. In addition, the refractive properties of the prism may be utilized for reducing or completely cancelling the wobble effect.

The mirror body may have a cylindrical shape with the air bearing support being provided on the whole cylindrical surface. In a preferred embodiment, however, the mirror body is shaped as a hemisphere with air bearings provided on the whole hemispherical surface and on a circumferential edge portion of a flat surface of the mirror, the internal pyramid being provided in the central part of the flat surface. This embodiment has a very simple, compact and light-weight construction. The mirror body may then be manufactured by bisecting a metal ball which is normally used in all bearings. Such balls with perfectly machined spherical surfaces, i.e. with surface tolerances of 0.1 $\mu$ or less, are commercially available at low costs. Thus, the invention makes it possible to provide a low-cost rotary mirror system for a compact laser printer which, nevertheless, offers a high resolution and/or printing speed.

BRIEF DESCRIPTION OF THE DRAWINGS

Preferred embodiments of the invention will be explained below in conjunction with the accompanying drawings, in which.

DETAILED DISCUSSION OF THE INVENTION

Figure 1:
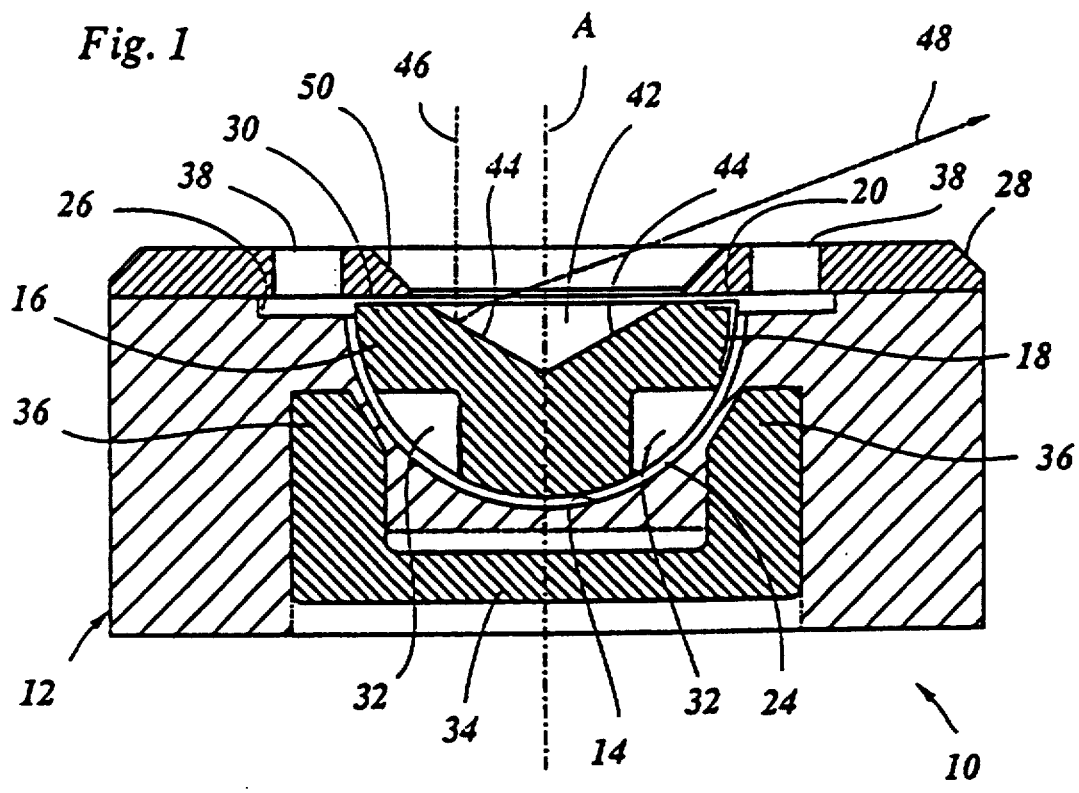
FIG. 1 is a sectional view of a rotary mirror system according to the invention.
Figure 2:
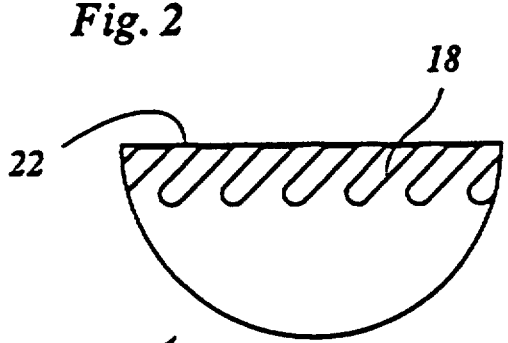
FIG. 2 is a lateral view of a mirror body used in the system according to FIG. 1.
Figure 3:
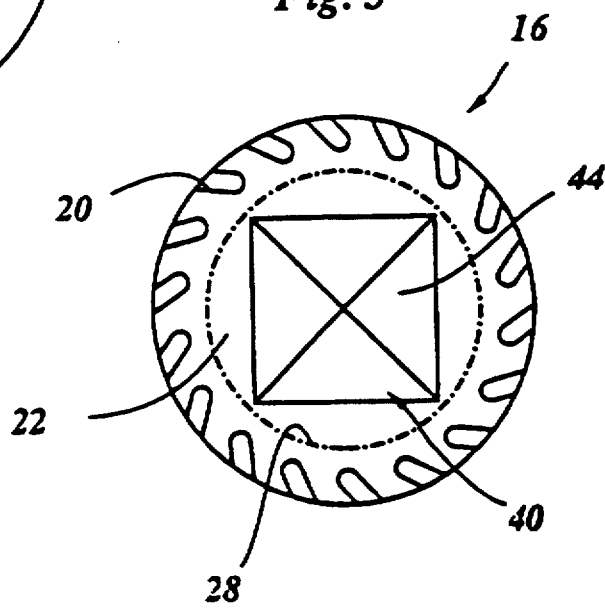
FIG. 3 is a plan view of the mirror body.

As is shown in FIG. 1, a rotary mirror system 10 comprises a stator block 12 defining a hemispherical bearing shell 14, and a hemispherical mirror body 16 which is rotatably supported in the bearing shell. The mirror body 16 has a diameter of about 10 mm. As can best be seen in FIGS. 2 and 3, the mirror body 16 is formed with helical grooves 18 which extend from the circumferential edge over the upper part of the spherical surface, and with spiral grooves 20 which extend from the circumferential edge of the mirror body over the outer circumferential portion of the plane top surface 22 thereof. In FIG. 1, the depth of the grooves 18 and 20 is exaggerated. In practice, the depth of these grooves is in the order of a few $\mu$. When the mirror body 16 rotates in a counter-clockwise direction in FIG. 3, the inclined grooves 18 serve to ventilate air into a narrow gap 24 between the mating spherical surfaces of the bearing shell 14 and the mirror body 16, thereby forming a dynamic air bearing support for the mirror body 16.

The top surface of the stator block 12 is formed with a shallow recess 26 which surrounds the bearing shell 14. A ring 28 which is secured to the top surface of the stator block 12 covers the outer circumferential portion of the recess 26 as well as the outer circumference of the mirror body 16. A narrow gap 30 is defined between the top surface 22 of the mirror body 16 and the bottom surface of the inner portion of the ring 28. The grooves 20 serve to introduce air into the gap 30. However, since the grooves 20 do not extend to the inner circumference of the ring 28, which is shown by a phantom line in FIG. 3, an air cushion with an increased air pressure is formed in the gap 30, thereby constituting another air bearing support which holds or suspends the mirror body 16 in the bearing shell 14 and provides exact alignment of the axis of rotation normal to the plane of the ring 28.

In the shown embodiment, the lower portion of the hemispherical mirror body 16 is formed with a cutout which accommodates a permanent magnet 32. The stator block 12 accommodates a yoke 34 which has magnetic poles 36 opposing the magnet 32. The yoke 34 is provided with electric coils (not shown) and constitutes the stator of an electric motor for driving the mirror body 16. The rotor of this electric motor is formed by the mirror body 16 itself, which is provided with the permanent magnet 32. Alternatively, the metal body of the mirror body 16 may be magnetized as a whole. The ring 28 is provided with bores with filters 38 inserted therein for supplying clean air to the air bearing channels or gaps.

A recess 40 in the shape of an inverted pyramid is formed in the center portion of the plane top surface 22 of the mirror body 16. The base of the recess or pyramid 40 which lies in the plane of the surface 22 is generally shaped as a regular polygon (as a square in the shown embodiment). The center of the base polygon as well as the tip of the pyramid lie on the rotational axis of the mirror body 16. Thus, the pyramid 40 has an axis of symmetry (symmetry under rotations about 90 in the shown embodiment) which coincides with the axis of rotation of the mirror body 16. An optical prism 42, which has the same pyramid shape as the recess 40, is fitted in the recess 40 and secured therein by means of an adhesive, for example. The triangular side surfaces of the recess 40 or, more precisely, the corresponding side surfaces of the prism 42 form mirror facets 44 for deflecting a light beam 46 in the manner shown in FIG. 1. Before the prism 42 has been inserted into the recess 40, the side surfaces of the prism have been accurately machined and mirror finished and plated with a reflective coating (a metal coating for example) and a protective surface layer.

As shown in FIG. 1, a light beam 46, for example, the modulated laser beam of a laser printer, is incident on the mirror body 16 in a direction parallel with the axis of rotation A, but is laterally offset therefrom. Thus, the incoming light beam 46 passes the base surface of the prism 42 at right angles, i.e. without refraction, is reflected at the mirror facet 44 and then undergoes refraction at the base surface of the prism 42. Thus, the reflected beam 48 forms an angle of slightly less than 90° with the axis of rotation A of the mirror body. The inner periphery of the ring 28 is formed with a conical surface 50 so as to avoid interference with the reflected beam 48. When the mirror body 16 is rotated about the axis A, the reflection plane which is the plane of the drawing in FIG. 1, is also rotated and thus an angular displacement of the reflected beam 48 is achieved. This reflected beam describes a slight curvature. In case that the mirror system is used for exposure of a photoconductive layer disposed on a drum, it is preferred to correct this curved path by means of a correcting prism positioned between the drum and mirror facet 44. Also a mirror or lens can be used for this purpose.

With the above-described construction, the mirror body 16 is extremely compact and light-weight, so that very high rotational speeds can be achieved without inducing excessive centrifugal forces. The air bearings support the mirror body with a minimum of friction and at the same time with minimal play. Since the mass of the mirror body 16 is comparatively low and a high air pressure is generated in the gaps 24 and 30, the natural frequency of oscillations of the mirror body within the air bearing is much higher than the rotational frequency, so that resonance problems are avoided and a stable rotation of the mirror body is achieved. Since the mirror facets 44 of the prism 42 can be machined precisely, all the factors which could result in a wobble of the reflected laser beam 48 are largely eliminated.

The structure described above further has the advantage that the mirror facets 44 are protected against dust and humidity. Since the air for the air bearing is sucked-in through the filters 38 and is forced through the gap 30 and then blown out through the central opening of the ring 28, the top surface of the prism 42 is also protected against dust. If the axis of the mirror body 16 is tilted by a small angle, the direction of the outgoing laser beam 48 is deviated by twice this angle, due to reflection at the mirror facet 44. However, since the refractive top surface of the prism 42 is also tilted, the refraction of the beams 46,48 at this surface is changed such that the deviation of the outgoing beam 48 is at least partly compensated. To optimize this compensation, a prism shaped as a double-pyramid can be used instead of the prism 42 shown in FIG. 1.

The present invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed:

1. A rotary mirror system for angularly deflecting a light beam, said system comprising an air bearing means for providing an air bearing support, a mirror body rotatably supported by said air bearing means in which an internal pyramid is formed and on which one or more mirror facets are provided in said mirror body, said mirror body being a rotor of an electric motor, wherein said mirror facets comprise side surfaces of said internal pyramid formed in and opening towards one axial end surface of said mirror body and having an axis of symmetry coinciding with a rotational axis (A) of said mirror body, orientation of said mirror facets relative to an incoming light beam being such that a reflected beam leaves said internal pyramid at an inclined angle with respect to said rotational axis (A).

2. A rotating mirror system as in claim 1, wherein a pyramid-shaped optical prism is fitted in said internal pyramid formed in said mirror body, said optical prism comprising side surfaces corresponding to said side surfaces of said internal pyramid of said mirror body.

3. A rotating mirror system as in claim 2, wherein said side surfaces of said prism are provided with a reflective coating corresponding to and forming said mirror facets.

4. A rotating mirror system as in claim 3, wherein said prism is bonded to said mirror body by means of an adhesive applied on said side surfaces of said internal pyramid.

5. A rotary mirror system as in anyone of the preceding claims wherein said air bearing means includes a hemispherical bearing shell, formed in a stator block, and said mirror body has a hemispherical shape which is received in said hemispherical bearing shell, said air bearing support being provided between mating hemispherical surfaces of said mirror body and said hemispherical bearing shell.

6. A rotary mirror system as in claim 5, wherein said stator block is covered by a ring, the inner circumferential edge portion of which projects over a flat surface of said mirror body, a further air bearing support being formed between said flat surface of said mirror body and a surface of said ring opposed thereto.

7. A rotary mirror system according to claim 6, wherein said ring is provided with air filters for introducing air to be supplied as said air bearing support via a recess which surrounds said hemispherical bearing shell.

8. A rotary mirror system according to claim 1, wherein said mirror body is formed with helical grooves which extend from a circumferential edge thereof over an upper part of a spherical surface and with spiral grooves which extend from said circumferential edge thereof over an outer circumferential portion of a plane top surface thereof.

* * * * *